(12) United States Patent
Sasada et al.

(10) Patent No.: US 10,088,364 B2
(45) Date of Patent: Oct. 2, 2018

(54) COLORIMETRY SYSTEM FOR DISPLAY TESTING

(71) Applicant: Instrument Systems Optische Messtechnik GmbH, Munich (DE)

(72) Inventors: Taro Sasada, Munich (DE); Jurgen Neumeier, Rauenberg (DE); Reto Haring, Munich (DE)

(73) Assignee: INSTRUMENT SYSTEMS OPTISCHE MESSTECHNIK GMBH, Munich (DE)

( * ) Notice: Subject to any disclaimer, the term of this patent is extended or adjusted under 35 U.S.C. 154(b) by 0 days.

(21) Appl. No.: 15/016,587

(22) Filed: Feb. 5, 2016

(65) Prior Publication Data

US 2016/0231175 A1 Aug. 11, 2016

(30) Foreign Application Priority Data

Feb. 9, 2015 (EP) .................................... 15154349

(51) Int. Cl.

| | |
|---|---|
| G06K 9/00 | (2006.01) |
| G01J 3/50 | (2006.01) |
| G01J 3/46 | (2006.01) |
| G01J 3/52 | (2006.01) |
| G01J 3/02 | (2006.01) |

(Continued)

(52) U.S. Cl.
CPC .............. *G01J 3/506* (2013.01); *G01J 3/0243* (2013.01); *G01J 3/462* (2013.01); *G01J 3/465* (2013.01); *G01J 3/524* (2013.01); *G06K 9/4652* (2013.01); *G06K 9/4661* (2013.01); *G06T 7/90* (2017.01);

(Continued)

(58) Field of Classification Search
CPC ........... H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075

See application file for complete search history.

(56) References Cited

U.S. PATENT DOCUMENTS

2016/0234490 A1* 8/2016 Sasada .................... G01J 3/462

* cited by examiner

*Primary Examiner* — Duy M Dang
(74) *Attorney, Agent, or Firm* — Raymond R. Ferrera; Adams and Reese LLP

(57) ABSTRACT

The invention relates to a method for two-dimensional, spatially resolved measurement of tristimulus values of light emitted from a plurality of positions on a sample. It is an object of the invention to provide an improved method and system for spatially resolved chromaticity and luminance measurement in a standardized color space for display testing. The method of the invention comprises the steps of:

directing a first portion of the light to an RGB camera which produces a two-dimensional map of RGB color values;
  transforming the RGB color values into first tristimulus values to produce a map of tristimulus values;
  directing a second portion of the light to a colorimeter which produces second tristimulus values;
  deriving a tristimulus correction by comparing the second tristimulus values with at least a subset of the first tristimulus values; and
  applying the tristimulus correction to the first tristimulus values to produce a corrected map of tristimulus values.

Moreover, the invention relates to an imaging colorimeter system capable of two-dimensional, spatially resolved measurement of tristimulus values of light emitted from a plurality of positions on a sample.

12 Claims, 3 Drawing Sheets

(51) Int. Cl.
*H04N 9/30* (2006.01)
*H04N 17/04* (2006.01)
*G06T 7/90* (2017.01)
*G06K 9/46* (2006.01)

(52) U.S. Cl.
CPC ............... *H04N 9/30* (2013.01); *H04N 17/04* (2013.01); *G06K 9/46* (2013.01)

COLORIMETRY SYSTEM FOR DISPLAY TESTING

This application claims the benefit of prior-filed application EP15154349, filed on Feb. 9, 2015.

FIELD OF THE INVENTION

The invention relates to a method for two-dimensional, spatially resolved measurement of tristimulus values of light emitted from a plurality of positions on a sample, particularly for testing of matrix displays. Moreover, the invention relates to an imaging colorimeter system capable of two-dimensional, spatially resolved measurement of tristimulus values of light emitted from a plurality of positions on a sample.

BACKGROUND OF THE INVENTION

The invention generally relates to the field of imaging colorimeter applications, for example in the display manufacturing industry.

Imaging colorimetry-based testing systems have demonstrated to be successful in improving quality and reducing production costs for all types of flat panel displays, like LCD displays and LED display screens. Testing applications span the color matrix displays of smartphones, tablets, laptops, monitors, TVs etc.

Key components of known display testing environments are so-called imaging colorimeters, which provide accurate measurement of display visual performance that matches human perception of brightness, color, and spatial relationships. High-performance imaging colorimeters can accurately measure the color, the luminance (brightness) of individual pixels in a display as well as overall display uniformity.

In a typical manufacturing process, display visual performance is tested by automated inspection systems employing such imaging colorimeters. This has several advantages. A quantitative assessment of display defects is feasible, an increased testing speed can be achieved, and, most importantly, a simultaneous assessment of full display quality, i.e. uniformity and color accuracy is possible.

Generally, spectral photometers (also referred to as spectrophotometers) and photoelectric colorimeters are used for the measurement of chromaticity and luminance. Photoelectric colorimeters have optical filters approximating the tristimulus values, and measure the chromaticity and luminance by detecting the intensity of the light passing through these optical filters. A spectral photometer measures chromaticity and luminance by separating the light from the sample into wavelength components using, for example, a prism or a diffraction grating or a spectral filter and detecting the intensity of each primary wavelength element. As a result, a spectral photometer is capable of accurately measuring absolute chromaticity and luminance. However, the construction necessary for performing spectral separation is complex, which makes the equipment large in size as well as expensive.

An imaging colorimeter system is for example known from U.S. Pat. No. 5,432,609. In the known system, an optical filter means, which allows only certain wavelengths to pass through, is located in front of a first light receiving means which receives the light from multiple points on a sample to be tested. In this way, the chromaticity and luminance at the multiple points on the sample is measured with spatial resolution by a simple method using the same principle as that employed by a photoelectric colorimeter. Moreover, a spectral separating means which separates light into primary wavelengths is located in front of a second light receiving means which receives the light from one prescribed point among the above multiple points, i.e. without spatial resolution. Hence, the chromaticity and luminance at the above one prescribed point among the multiple points is accurately measured by a spectrophotometer-type instrument. The measurements for the multiple points on the sample, which are output from the photoelectric colorimeter-type first light receiving means, are corrected based on the accurate measurement output from the spectral photometer-type second light receiving means.

SUMMARY OF THE INVENTION

It is an object of the invention to provide an improved method and system for spatially resolved chromaticity and luminance measurement in a standardized color space.

In accordance with the invention, a method for two-dimensional, spatially resolved measurement of tristimulus values of light emitted from a plurality of positions on a sample is disclosed. The method comprises the steps of:

directing a first portion of the light to an RGB camera which produces a two-dimensional map of RGB color values;

transforming the RGB color values into first tristimulus values to produce a map of tristimulus values;

directing a second portion of the light to a colorimeter which produces second tristimulus values;

deriving a tristimulus correction by comparing the second tristimulus values with at least a subset of the first tristimulus values; and applying the tristimulus correction to the first tristimulus values to produce a corrected map of tristimulus values.

An essential feature of the invention is the use of an RGB camera for spatially resolved measurement of chromaticity. This enables fast and cost-effective testing, for example in the production lines of matrix displays. The RGB camera attributes a set of RGB color values to each of the plurality of positions on the sample.

In camera technology, RGB cameras are highly developed. RGB cameras of high quality are commercially available at low cost. They allow high sensitivity and high resolution for capturing image data in milliseconds. Commercial RGB cameras typically employ CMOS or CCD image sensor technology in combination with higher scale integration electronics. In order to produce a two-dimensional map of RGB color values, the CMOS or CCD image sensor of a conventional RGB camera is often combined with a so-called Bayer filter arrangement, in which green is given twice as many detectors as red and blue (ratio 1:2:1) in order to achieve higher luminance resolution than chrominance resolution. The filter arrangement comprises a grid of red, green, and blue detectors arranged so that the first row is RGRGRGRG, the next is GBGBGBGB, and that sequence is repeated in subsequent rows. For every channel, missing pixels are obtained by interpolation in a de-mosaicing process to build up the complete RGB map.

However, the spectral channel sensitivities of an RGB camera are very far from the tristimulus values XYZ that need to be determined to accurately assess the visual performance of a sample in conformity with the human perception of brightness and color. Hence, the invention proposes to transform the RGB color values into (first) tristimulus values to produce a map of tristimulus values. In general, the transformation of RGB color values into tristimulus values XYZ is not possible because the tristimulus values depend (via the corresponding color matching functions as defined in the CIE1931 standard) on the spectrum of the measured light. The full spectral information is lost after conversion of the first portion of the light into the map of RGB color values by the RGB camera.

It is an insight of the invention that, at least for a set of 'typical' samples emitting light with a similar spectral distribution, a (linear) transformation can be found for translating the RGB color values into (first) tristimulus values XYZ, wherein a remaining deviation of the first tristimulus values from the 'true' tristimulus values can be corrected for on the basis of the second tristimulus values that are measured according to the invention from the second portion of the light using the colorimeter having no spatial resolution. The resulting corrected map of tristimulus values is of sufficient accuracy for assessing the performance of, for example, matrix displays, even though the 'true' (second) tristimulus values are not measured with spatial resolution.

The tristimulus correction applied according to the invention to the first tristimulus values is derived by comparing the second tristimulus values with at least a subset of the first tristimulus values. For example, the second portion of the light received by the colorimeter is emitted from a number of positions within a spot on the sample, wherein the positions within the spot at least partly overlap with the positions on the sample from which the first portion of the light is emitted. The second tristimulus values can then be compared with those first tristimulus values attributed to positions on the sample within the spot in order to determine the deviation of the first tristimulus values from the second tristimulus values and to derive a corresponding correction. This correction is then applied to all first tristimulus values to produce the corrected map of tristimulus values.

The position of the spot on the sample may be predetermined (for example in the center of a matrix display to be tested). The position (and/or size) of the spot may also be controlled by a user as required.

In a preferred embodiment, the colorimeter is a photoelectric colorimeter comprising a set of at least three color filters and one or more photo sensors. The spectral sensitivities of the three filters are matched to the CIE tristimulus color matching functions. Such colorimeters are thus also known as three-filter colorimeters. Sometimes provision is made for a fourth channel with a fourth filter element in order to achieve a better matching to the X color matching function. Besides chromaticity measurement, these colorimeters often also provide further basic photometric measurements, such as, for example, luminance, illuminance, luminous intensity, or luminous flux. This can advantageously be exploited according to the invention for an additional dynamic measurement, i.e. a measurement of a temporal variation of a photometric parameter of the sample (for example due to display 'flicker'), which would not be feasible with the RGB camera alone. The colorimeter can be used to perform parametric test and alignment of flat panel displays and other samples, like contrast measurement, gamma alignment, gamut testing etc.

Photoelectric colorimeters use detectors which comprise high quality photodiodes with series-connected filters. The incident light is converted by the detector into signals which directly yield the standard XYZ tristimulus values. However, matching of the spectral sensitivities of the filters to the standard CIE tristimulus curves can be achieved only with finite accuracy. Deviations will occur between the standard CIE curves and the sensitivity curves of the photoelectric colorimeter. These differences are typically negligible as long as the light to be measured exhibits a continuous energy output over the entire visible spectrum. However, the error may be significant if steep edges or spectral lines occur in the spectrum. Hence, three-filter colorimeters are not optimally suited to measure light sources with spectral lines, like, for example, discharge lamps, or with narrow spectral energy distributions, like, for example, LEDs.

Hence, in an alternative embodiment of the invention, the colorimeter may be a spectral photometer. A spectral photometer is most ideal in terms of accuracy for measuring the spectral energy distribution of the second portion of the light, which determines the colorimetric quantities. The spectral photometer records the radiation spectrum of the second portion of the light and calculates the second tristimulus values therefrom. The exact CIE color matching curves are stored in the software of the spectral photometer and are used to process the data from the measured spectral energy distribution of the second portion of the light. Hence, the measurement error associated with the photoelectric (three-filter) colorimeter is avoided by using a spectral photometer as colorimeter instead. On the other hand, when compared to a photoelectric colorimeter, the spectral photometer has its limitations in terms of speed of measurement, cost and portability.

In a further preferred embodiment of the invention, the transformation for transforming the RGB color values into the first tristimulus values is derived in a prior training step, in which:
  RGB color values and second tristimulus values are produced from a set of three or more training samples, and
  a 3×3 transformation matrix which transforms the RGB color values into the first tristimulus values is found such that a deviation of the first tristimulus values from the second tristimulus values is minimized.

In order to be able to transform the RGB color values into the first tristimulus values it is necessary to determine a valid transformation rule. It turns out that a linear transformation using a 3×3 transformation matrix that maps the RGB color space onto the XYZ color space is appropriate for most applications. The nine parameters of the 3×3 transformation matrix are determined once, i.e. prior to the actual measurement of the sample to be tested, in the training step. At least three training samples are necessary to determine the nine matrix components. In order to achieve sufficient accuracy, even more than three training samples may be used (a number of about 20 training samples has proven to be useful in practice), wherein the matrix components that provide the best transformation results for all training samples are found, for example, by a least-squares optimization. The three training samples must not necessarily be three different matrix displays, for example. Instead, typically a single matrix display from the product to be tested can be used, wherein three or more (typically about 20) test patterns of appropriately selected colors are displayed via the matrix display. These test patterns are then measured in the training step to derive the matrix components.

The tristimulus correction is preferably derived by finding a diagonal 3×3 correction matrix which transforms the first tristimulus values of the subset of tristimulus values into corrected tristimulus values such that a deviation of the corrected tristimulus values from the second tristimulus values is minimized. This corresponds to a re-scaling of each of the XYZ values which has proven to be sufficient to obtain a sufficient accuracy of the chromaticity and luminance measurement. This applies, of course, only under the provision that the first tristimulus values derived from the RGB color values are already sufficiently close to the 'true' tristimulus values (in order to achieve this in practice, the afore-described training scheme may be employed, for example). The three independent parameters (scaling factors) of the diagonal 3×3 matrix can thus simply be found by dividing each of the second tristimulus values by the corresponding first tristimulus value of the subset (within the spot from which the second tristimulus values are measured). Finally, this correction is applied, as explained above, to each of the first tristimulus values so as to obtain the corrected map of tristimulus values.

The invention does not only relate to a method but also to an imaging colorimeter system capable of two-dimensional, spatially resolved measurement of tristimulus values of light emitted from a plurality of positions on a sample. The system comprises:
- a beam splitter splitting the light emitted from the sample into a first portion and a second portion;
- an RGB camera receiving the first portion of the light and producing a two-dimensional map of RGB color values;
- a controller transforming the RGB color values into first tristimulus values to produce a map of tristimulus values; and
- a colorimeter receiving the second portion of the light and producing second tristimulus values,
- wherein the controller is further arranged to:
- derive a tristimulus correction by comparing the second tristimulus values with at least a subset of the first tristimulus values; and
- apply the tristimulus correction to the first tristimulus values to produce a corrected map of tristimulus values.

The imaging colorimeter system of the invention comprises a beam splitter which splits up the light received from the sample into the first and second portions of the light which are then received by the RGB camera and the colorimeter, respectively. Provision is made for a controller (for example a commercially available programmable micro controller) which is arranged to transform the RGB color values into first tristimulus values, thereby producing a map of tristimulus values (for example by applying the above-mentioned 3×3 transformation matrix), to derive the tristimulus correction and to apply the tristimulus correction to produce the corrected map of tristimulus values. Hence, the invention provides a fully automated, self-contained inspection system for quantitative and high-accuracy assessment of display defects including simultaneous assessment of full display quality, i.e. uniformity and color accuracy. The system operates at a high testing speed and can be made available at low cost.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention.

DETAILED DESCRIPTION OF THE EMBODIMENTS

Figure 1:
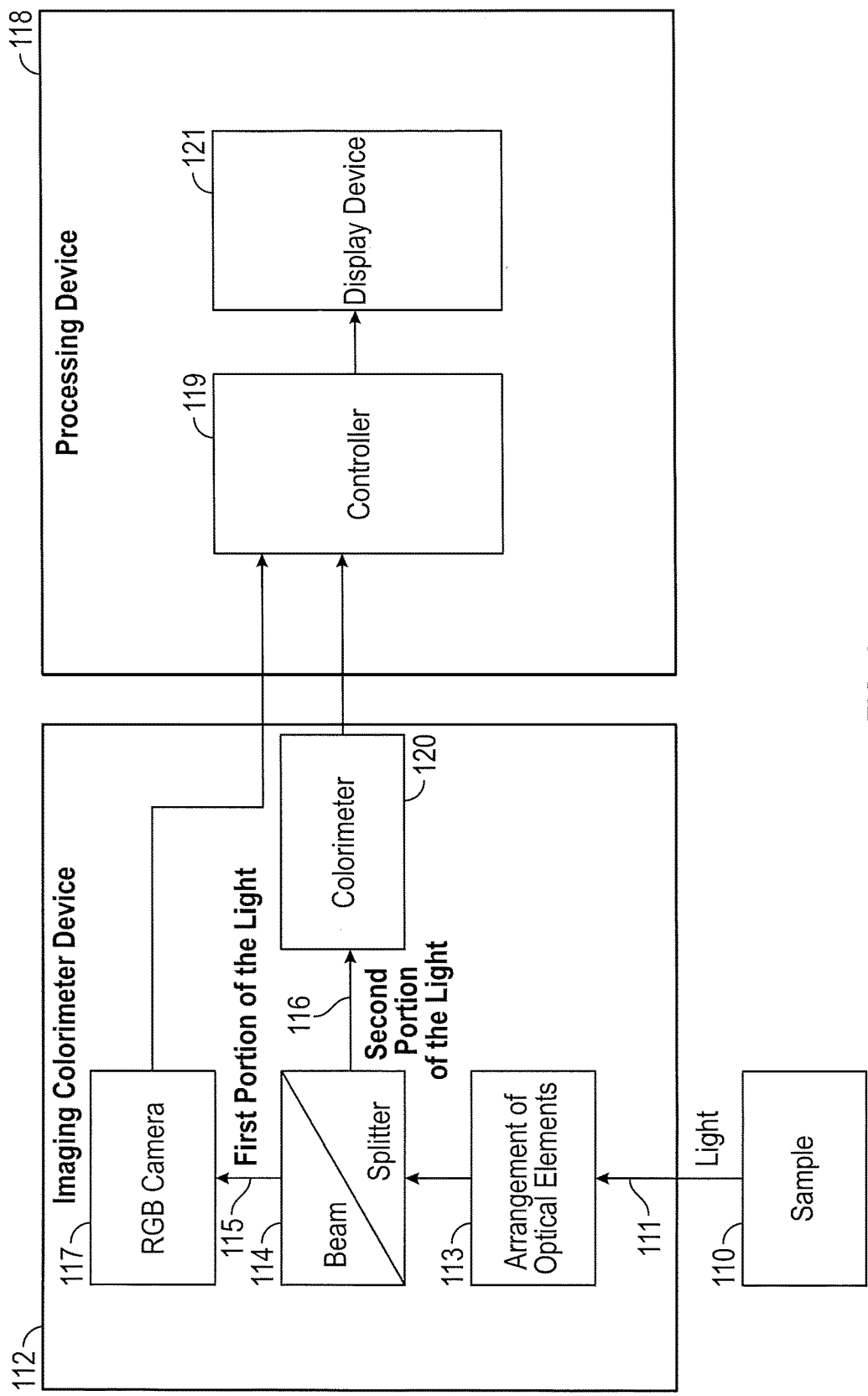
FIG. 1 shows an imaging colorimeter system according to the invention as a block diagram.

In FIG. 1 a sample (an LCD matrix display) to be tested with respect to chromaticity, luminance and uniformity is designated by 110. The light 111 emitted by the sample 110 is directed to an imaging colorimeter device 112 according to the invention. The light 111 passes an arrangement 113 of optical elements (lenses/apertures) and a beam splitter 114. The beam splitter 114 splits the light 111 into a first portion 115 and a second portion 116. The beam splitter 114 may comprise a pair of non-polarizing beam splitter cubes twisted with respect to each other by 90° in order to compensate for any polarization of the light 111. Alternatively, the beam splitter 114 may be a (metal) mirror with a hole aperture, wherein the reflected light is the first portion 115 of the light, while the light passing through the hole is the second portion 116 of the light. As a further alternative, a $\lambda/4$-plate may be used in combination with a single non-polarizing beam splitter cube such that polarization errors are minimized. A simple non-polarizing beam splitter cube may be used as well as a so-called 'Polka-dot' beam splitter. A further option is arranging an optical probe (for example a tip of an optical fiber) in a virtual image plane determined by the optical elements of the colorimeter device 112, wherein the second portion 116 of the light is propagated through the optical fiber.

An RGB camera 117 receives the first portion 115 of the light such that a two-dimensional image of the sample 110 is generated in an image plane on a sensor array of the RGB camera 117. The resulting (digital) camera image constitutes a two-dimensional map of RGB color values within the meaning of the invention. The map of RGB color values attributes a set of RGB color values (a red value, a green value, and a blue value) to each position on the sample 110. Provision may be made for a filter (not shown) to reduce so-called Moiré artefacts caused by the matrix arrangements of the LCD matrix display of the sample 110 and the sensor of the RGB camera 117. The Moiré filter may be realized as an optical filter acting on the optical image before the camera 117 or as digital filter acting on the digital image.

The map of RGB color values is communicated to a processing device 118 comprising a controller 119 (a processor) which transforms the RGB color values into first tristimulus values XYZ such that a set of tristimulus values (X, Y, and Z) is attributed to each position on the sample 110. This transformation may be performed using a 3×3 transformation matrix that has been derived in a prior training step (see below).

The second portion 116 of the light is directed to a colorimeter 120 which may be, for example, a compact and low-cost photoelectric three-filter colorimeter of known type. The colorimeter 120 produces second tristimulus values XYZ. The second portion 116 of the light is emitted from a number of positions within a spot on the sample 110. The colorimeter 120 produces the second tristimulus values without spatial resolution.

The second tristimulus values are communicated to the processing device 118 as well. The controller 119 derives a tristimulus correction by comparing the second tristimulus values with a subset of the first tristimulus values that is attributed to the positions within the spot from which the second portion 116 of the light is emitted. The controller 119 then applies the tristimulus correction to the complete map of first tristimulus values to produce a corrected map of tristimulus values.

Individual X, Y, and Z maps of the corrected map of tristimulus values are then output via a display device 121 in order to assess color uniformity as well as different types of artefacts (line defects, pixel defects, black Mura, yellow Mura etc.). Such artefacts may also be detected in an automated fashion by a corresponding image processing programming of the controller 119.

The Y-channel of the colorimeter 120 may further be used to assess dynamic artefacts (undesirable temporal variations of photometric parameters), such as image flicker, for example. The colorimeter 120 may also be a combination of a fast Y-channel photometer for dynamic artefact testing and of a spectral photometer for measurement of the tristimulus values according to the invention.

Figure 2:
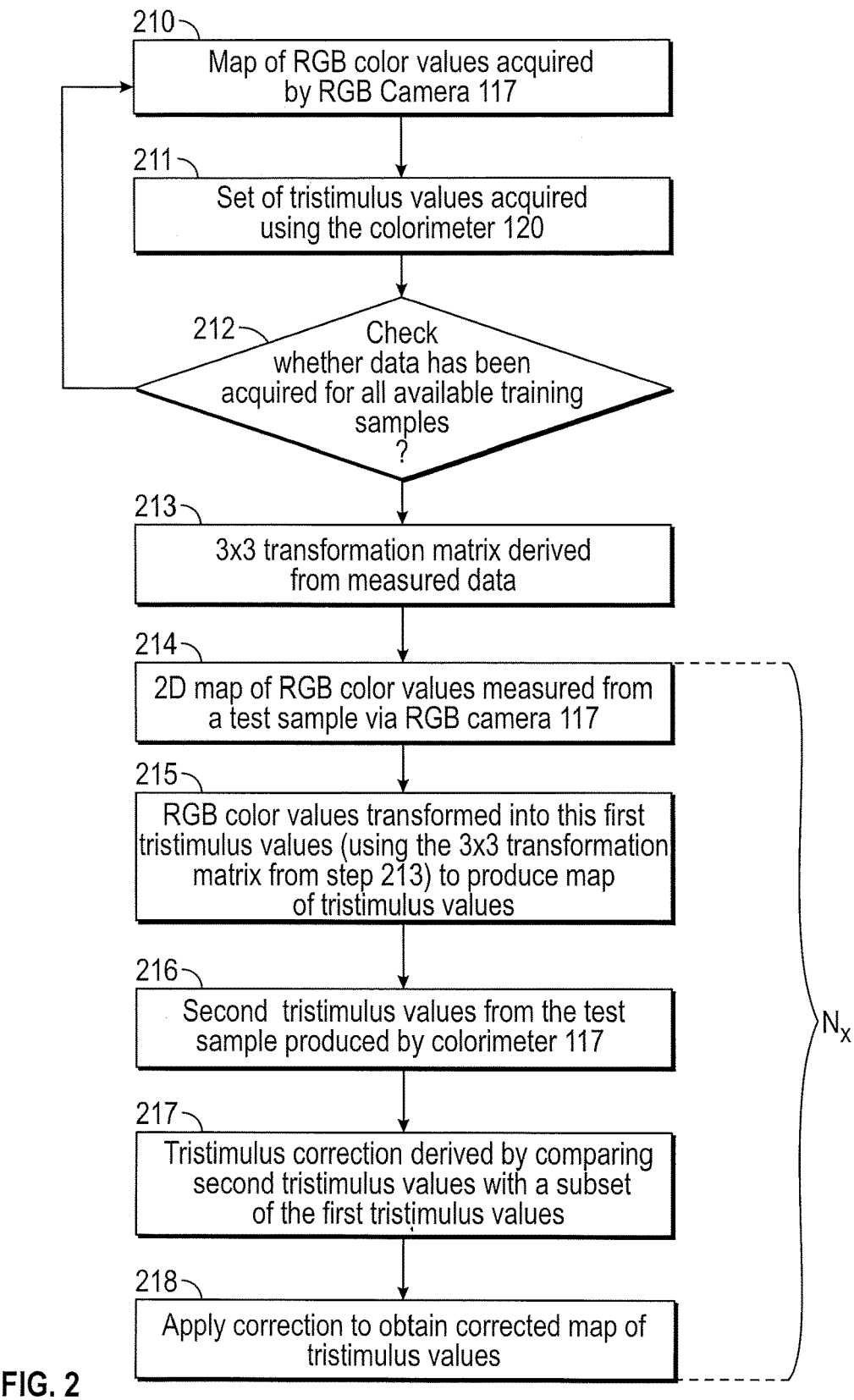
FIG. 2 shows the method of the invention in a flow chart.

FIG. 2 illustrates the method of the invention as a flow chart. At first, a typical matrix display to be tested is selected and used for performing an initial training step which encompasses steps 210, 211, 212, and 213 in FIG. 2. In step 210, a map of RGB color values is acquired by the RGB camera 117 from the training sample. In parallel, a set of tristimulus values is acquired using the colorimeter 120 in step 211. In step 212 it is checked whether data have been acquired for all available training samples. As long as this is not the case, steps 210 and 211 are repeated, wherein a different training sample is used in each repetition. The training samples are not different matrix displays. Instead, different test patterns of appropriately selected colors are displayed via the selected single matrix display. After a sufficient number of repetitions, a 3×3 transformation matrix that maps the RGB color space onto the XYZ color space is derived from the measured data in step 213, wherein the matrix components that provide the best transformation results for all training samples are found by a least-squares optimization procedure. In this optimization procedure, the (squared) deviations of the transformation results from the tristimulus values measured via the colorimeter 120 are minimized.

After the training step, the actual display testing procedure starts in step 214. In step 214, the two-dimensional map of RGB color values is measured from a test sample via the RGB camera 117. The RGB color values are transformed into the first tristimulus values in step 215 (using the 3×3 transformation matrix established in the prior training step) to produce the map of tristimulus values. Colorimeter 117 produces second tristimulus values from the test sample in step 216. The tristimulus correction is derived by comparing the second tristimulus values with a subset of the first tristimulus values in step 217. To this end, a diagonal 3×3 correction matrix is found which transforms the first tristimulus values of the subset into corrected tristimulus values. The three independent parameters (scaling factors) of the diagonal 3×3 matrix are determined by dividing each of the second tristimulus values by the corresponding first tristimulus value of the subset (within the spot on the sample from which the second tristimulus values are measured). Finally, this correction is applied to the complete map of tristimulus values in step 218 to obtain the corrected map of tristimulus values. Steps 214 through 218 are repeated for an arbitrary number N of samples to be tested.

Figure 3:
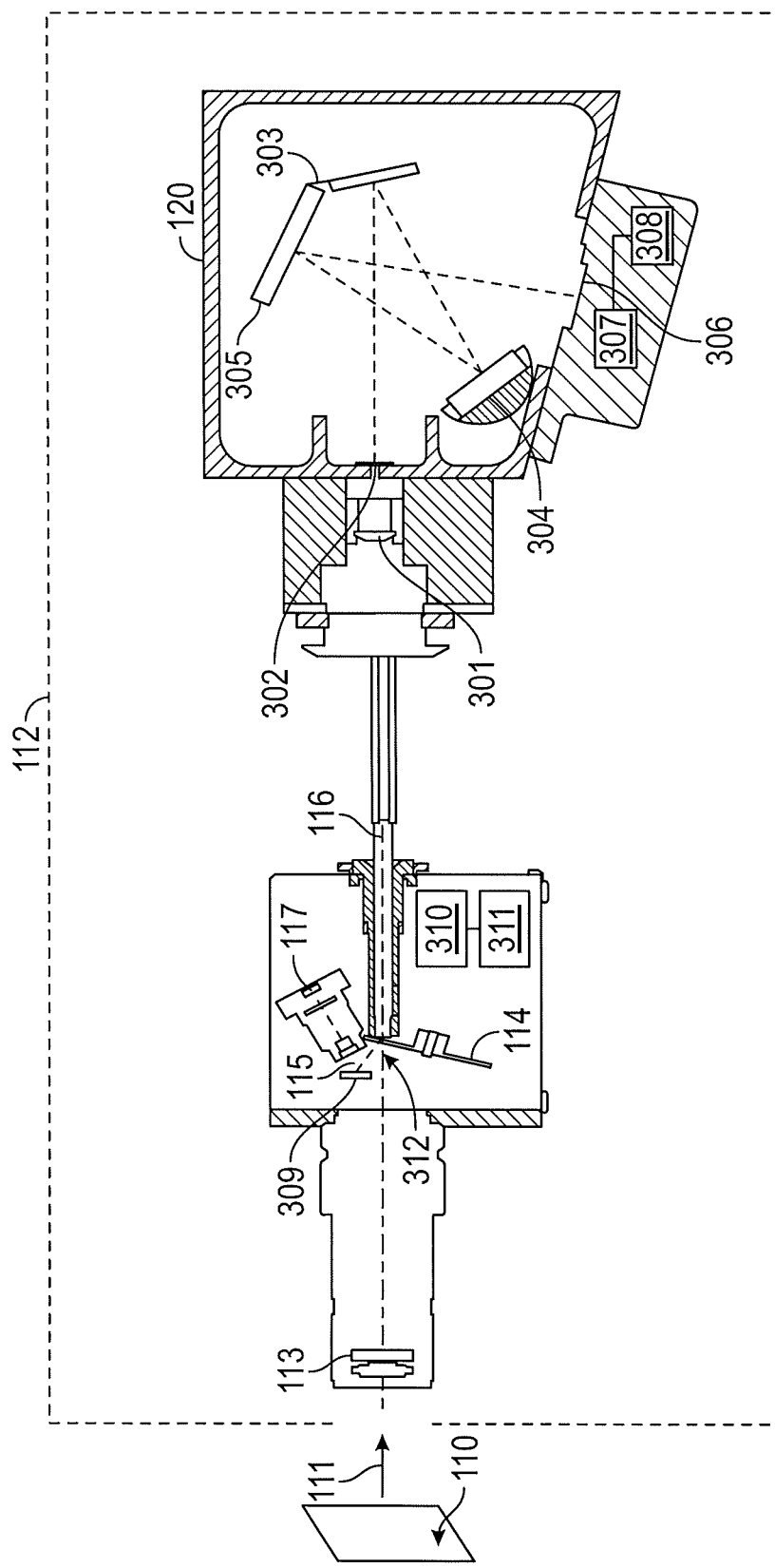
FIG. 3 schematically illustrates the hardware of an imaging colorimeter system according to the invention in more detail.

FIG. 3 illustrates the hardware of an embodiment of an imaging colorimeter device 112 according to the invention in more detail. The device 112 comprises an RGB camera 117 and a colorimeter 120 which is spectral photometer in the embodiment of FIG. 3. The processing device 118 is not shown in FIG. 3. The RGB camera 117 produces an RGB image, which is the two-dimensional map of RGB color values within the meaning of the invention. The sample 110 to be characterized is an LCD matrix display (or an OLED matrix display, or any other type of matrix display).

The colorimeter 120 and the RGB camera 117 share the light emitted by sample 110 such that the map of RGB color values (via the RGB camera 117) and the tristimulus values XYZ (via the colorimeter 120) can be measured simultaneously. The light 111 from the sample 110 is incident on beam splitter 114 which splits the first portion 115 of incident light 111 towards the RGB camera 117, and the second portion 116 of incident light 111 towards the colorimeter 120. In the depicted embodiment, the beam splitter 114 is a mirror having an aperture 312 on its surface through which the second portion 116 of the light passes.

Lens 301 focuses the second portion 116 of the light through a slit 302 into spectral photometer 120. The spectral photometer 120 includes a collimating mirror 303, a dispersive element (a grating) 304, a focusing mirror 305, and a detector array 306. The spectral photometer 120 further comprises a processor unit 307 and a memory circuit 308. Memory circuit 308 may store commands that, when executed by processor unit 307, cause the spectral photometer 120 to perform operations consistent with embodiments of the invention. For example, processor unit 307 may calculate tristimulus values XYZ from the measured optical spectrum of the second portion 116 of the light and establish communication with the processing device 118 (see FIG. 1).

The first portion 115 of incident light 111 reflected from beam splitter 114 is directed by optical component 309 towards the RGB camera 117. The RGB camera 117 is connected to a further processor unit 310 and a further memory circuit 311. Memory circuit 311 may store commands that, when executed by processor 310, cause the system to perform operations consistent with embodiments of the invention. For example, processor unit 310 may establish communication with the processing device 118 (see FIG. 1) to communicate the measured map of RGB color values for further processing in accordance with the invention.

The invention claimed is:

1. Method for two-dimensional, spatially resolved measurement of tristimulus values of light emitted from a plurality of positions on a sample, comprising the steps of:
    directing a first portion of the light to an RGB camera which produces a two-dimensional map of RGB color values;
    transforming the RGB color values into first tristimulus values to produce a map of tristimulus values;
    directing a second portion of the light to a colorimeter which produces second tristimulus values;
    deriving a tristimulus correction by comparing the second tristimulus values with at least a subset of the first tristimulus values; and
    applying the tristimulus correction to the first tristimulus values to produce a corrected map of tristimulus values.

2. Method of claim 1, wherein the second portion of the light is emitted from a number of positions within a spot on the sample, wherein the colorimeter produces the second tristimulus values without spatial resolution.

3. Method of claim 2, wherein the positions within the spot at least partly overlap with the positions on the sample from which the first portion of the light is emitted.

4. Method of claim 1, wherein the colorimeter is a photoelectric colorimeter comprising a set of at least three color filters and one or more photo sensors.

5. Method of claim 1, wherein the colorimeter is a spectral photometer.

6. Method of claim 1, wherein the transformation for transforming the RGB color values into the first tristimulus values is derived in a prior training step, in which:
    RGB color values and second tristimulus values are produced from a set of three or more training samples, and a 3×3 transformation matrix which transforms the RGB color values into the first tristimulus values is found such that a deviation of the first tristimulus values from the second tristimulus values is minimized.

7. Method of claim 1, wherein the tristimulus correction is derived by finding a diagonal 3×3 correction matrix which transforms the first tristimulus values of the subset of tristimulus values into corrected tristimulus values such that a deviation of the corrected tristimulus values from the second tristimulus values is minimized.

8. Method of claim 1, wherein the sample is a matrix display.

9. Method of claim 1, further comprising measurement of a temporal variation of a photometric parameter of the sample.

10. Imaging colorimeter system capable of two-dimensional, spatially resolved measurement of tristimulus values of light emitted from a plurality of positions on a sample, comprising:

a beam splitter splitting the light emitted from the sample into a first portion and a second portion;

an RGB camera receiving the first portion of the light and producing a two-dimensional map of RGB color values;

a controller transforming the RGB color values into first tristimulus values to produce a map of tristimulus values; and a colorimeter receiving the second portion of the light and producing second tristimulus values, wherein the controller is further arranged to:

derive a tristimulus correction by comparing the second tristimulus values with at least a subset of the first tristimulus values; and apply the tristimulus correction to the first tristimulus values to produce a corrected map of tristimulus values.

11. System of claim 10, wherein the colorimeter is a photoelectric colorimeter comprising a set of at least three color filters and one or more photo sensors.

12. System of claim 10, wherein the colorimeter is a spectral photometer.

* * * * *